United States Patent [19]

Thomas et al.

[11] 4,054,434

[45] Oct. 18, 1977

[54] PRODUCTION OF GLASS FIBRES

[75] Inventors: John Stuart Thomas, St. Helens; Allan Frank Mason, Wigan, both of England

[73] Assignee: Fibreglass Limited, St. Helens, England

[21] Appl. No.: 681,463

[22] Filed: Apr. 29, 1976

[30] Foreign Application Priority Data

May 15, 1975 United Kingdom ............... 20644/75

[51] Int. Cl.² .................... C03B 37/00; C03B 5/18
[52] U.S. Cl. ........................... 65/2; 65/65 R; 65/30 R; 65/134; 65/335
[58] Field of Search .................. 65/2, 65 R, 134–136, 65/30 R, 335

[56] References Cited

U.S. PATENT DOCUMENTS

| 3,382,135 | 5/1968 | Adams | 65/65 R X |
|---|---|---|---|
| 3,789,018 | 3/1974 | Paridon et al. | 65/134 |
| 3,830,749 | 8/1974 | Deeg et al. | 65/134 X |
| 3,847,664 | 11/1974 | Gravel | 65/65 R X |
| 3,852,108 | 12/1974 | Lindberg | 65/65 R X |
| 3,944,713 | 3/1976 | Plumat et al. | 65/134 X |

Primary Examiner—Robert L. Lindsay, Jr.
Attorney, Agent, or Firm—Schuyler, Birch, Swindler, McKie & Beckett

[57] ABSTRACT

The disclosed invention pertains to a process for melting glass in which scrap glass fibers containing carbonaceous material to provide a carbon content of 0.4%–0.04% in a batch is combined with batch materials in which the scrap amounts to 5%–25% by the weight of the batch. The batch is melted under oxidizing conditions and the resultant melt is used to form glass fibers.

10 Claims, 1 Drawing Figure

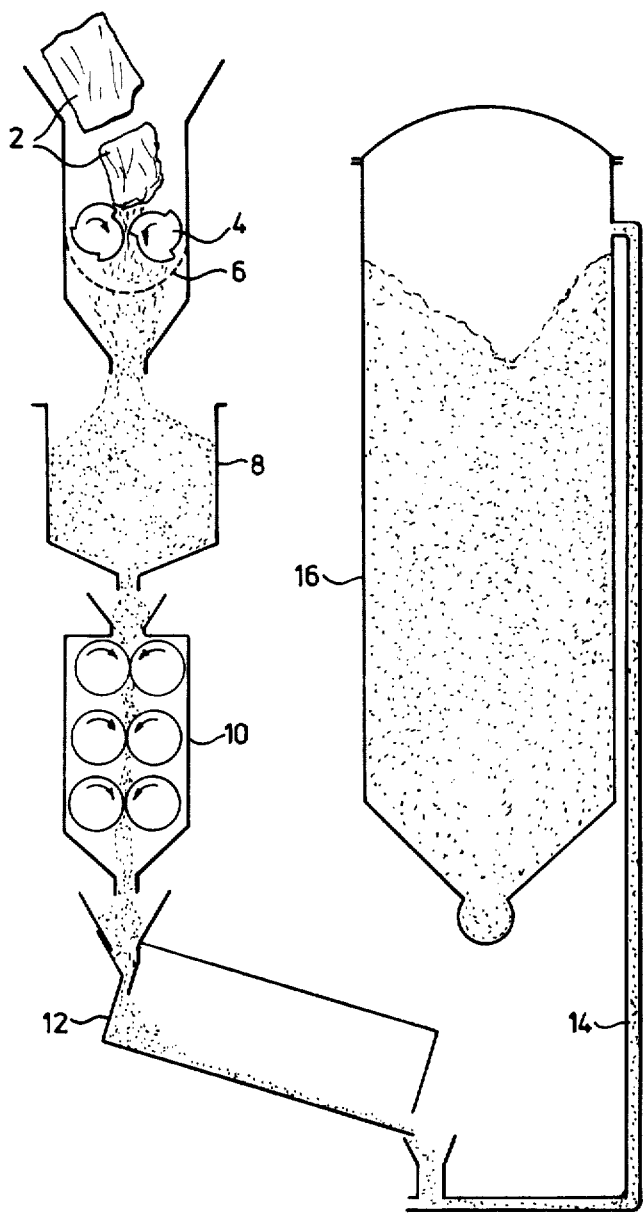

PRODUCTION OF GLASS FIBRES

The present invention relates to the production of glass fibre, more particularly to glass fibre produced by attenuating streams of molten glass, the molten glass, the molten glass having been produced from a batch containing a proportion of scrap fibre.

It is known to form glass fibre or filaments into insulating mats or boards are bonded together by a binding material, for example a phenolic binder. The binder is applied as the filaments are directed down onto a moving conveyor. Glass fibre is also manufactured as continuous filament, by causing glass streams to issue through orifices in the base of a vessel known as a bushing. The glass streams are attenuated into filaments by mechanical means i.e., the filaments are drawn down by being wound onto a winding drum or collet. Tissue is made in a similar bushing to continuous filament but attenuation is caused by a gaseous stream to form staple fibre.

In all these processes, relatively large amounts of scrap material is produced e.g. in the 'centrifugal' process, once the mat has been formed, the edges are trimmed to give a standard size, and this selvedge may be scrap. In the continuous filament process scrap is produced, when starting to wind on, or when cakes are badly wound, or breaks occur before a suitable size has been attained. It has previously been considered that the recovery and return of such material as cullet to the melting process was uneconomic due to both the bulk of the material and the presence of organic polymers and resins. However with the rising cost of raw materials, and increased production of glass wool for insulation purposes, pressure has been increased to reduce the quantity of raw materials going to waste, and the quantity of scrap to be disposed of.

We have now found that scrap material in both wool staple and continuous filament form can, if reduced to a milled form of a preferred mesh size and bulk density, be used directly as a batch material, and fed to a glass tank to feed a filberising process without any harmful effects. In general we find that at least 10% by weight of the batch fed can be in the form of such scrap material, and depending on the glass composition of the batch material and that desired in the finished product, in some cases as much as 25% by weight of the batch material fed can be in the form of scrap material.

It is important to ensure that oxidising conditions are maintained in the glass melt within the tank when operating with at least a part of the batch being fed in the form of finely divided scrap fibre containing non-mineral matter. The maintenance of oxidation conditions within the glass melt may not require any alteration where the batch contains only a small proportion of scrap fibre. However, as the proportion of scrap is increased, the quantity of non-mineral matter added with the scrap will also increase and to avoid problems arising, alterations may be needed in the fuel/combustion air ratio, and/or agents having an oxidising effect on the melt such as sodium nitrate may be added with the batch.

According to the present invention there is provided a process for forming glass filaments, comprising feeding batch to a glass melting tank providing molten glass to one or more fiberizing devices, converting the batch to a glass melt, transferring said melt to the fiberizing devices, and converting it to glass fibres by attenuating the streams of glass leaving the device or devices characterised in that the batch fed to the glass melting tank contains at least 1% by weight and up to 25% by weight of finely divided fibre, the fibre having been derived from one or more glass fiberizing processes and containing on or about its surface a proportion of non-mineral material, the conditions within the glass melt to which the batch containing the fibre is fed being maintained in an oxidising condition during melting operations with such a batch.

The quantity of finely divided fibre which can be accepted will depend on the glass batch being melted, the size of the tank, the nature of the fuel/combustion air feed ratios and the quantity of non-mineral matter present in the finely divided fibre. It is therefore difficult to define exact conditions except in relation to a particular tank or batch composition, but it is possible to provide general indications based on the content of non-mineral matter present in the finely divided fibre added to the batch. We prefer to operate with this as a carbon content in the batch of 0.4% by weight to 0.05% by weight. This either represents the carbon content remaining after the fibre is burnt before addition to the tank, or carbon content derived from the non-mineral matter on feeding the scrap to the tank without any treatment other than converting it to a finely divided form. We find that with this level of carbon distributed uniformly in the finely divided scrap fibre, and with the scrap fibre properly distributed in the batch, one can accommodate at least 2% by weight and up to 5% by weight of scrap fibre with little or no change in tank operating conditions. As levels of greater than 5% by weight of scrap fibre in the batch are reached it is necessary in most glass tanks to adjust the operating conditions e.g. by the addition of an oxidising agent such as for example sodium nitrate to the batch. Sodium nitrate can, if required, be added to the batch when the fibre in the batch is less than 5% by weight. As indicated above in some cases dependent on the level of binder or size on the fibre, it is possible to feed the scrap fibre without any treatment other than converting it to a finely divided form. It is unlikely however with scrap derived from a wool process in which a resinous binder is applied that more than 5% of such material can be used without heating the scrap to a temperature at which the binder is ignited without the glass melting.

It has previously been thought necessary to remove all carbonaceous material from a scrap fibre before it is returned to the melting tank see e.g. U.S. Pat. No. 3,847,664. We have in fact found that by ensuring any non-mineral matter is distributed uniformly in the batch, no problem arises provided the molten glass in the tank is maintained in an oxidising condition.

The fiberizing devices used conventionally all depend on the attenuation of glass streams by mechanical or centrifugal forces. They include spinners of the kind used in the Tel process and bushings with a series of tips or orifices in the base.

The source of glass fibre as indicated above can be from both a centrifugal process such as the 'Tel' process, or a continuous filament fiberizing process. In the case of the centrifugal process, scrap may be derived from stages in the process before the binder has been cured, in such a case we prefer to heat this scrap to cure the binder before carrying out the milling process.

The removal of excess binder by ignition is preferably carried out on the melted or finely divided fibre in a manner described hereinafter.

The scrap is preferably shredded by being passed through a coarse shredding operation e.g. using a hammer or flail mill before fed to the fine milling stage. It is normal where curing is needed to carry out this process after shredding as the material is then in a more easily handleable form. Such curing is carried out e.g. by passing on a moving belt through an oven, or any other convenient heating system.

Most types of mill which are used for mineral processing have been found suitable for use, in particular knife mills and roll crusher mills, edge runner mills, pan mill, ball mill, tube mill, a hammer mill, cryogenic mill, vibro-energy mill and disc mills. All of this equipment is convenional and is used so as to achieve a product with a bulk density of between 20 and 90 lbs/cu.ft and the particle size is such that 90% of the material is passed by a 200 mesh screen i.e., the mean particle size will be less than 60 microns. It is to be understood that particles having larger or smaller sizes can be used but for practical purposes we have found it desirable to use finely divided particles having a mean size of less than 500 microns. We are aware that milled glass fibre has previously been produced for use as a filler material, but this has been from high quality continuous filament rather than scrap material.

The ground or milled material is stored in a silo in the kind conventionally used to store batch materials before weighing to form the final batch. The proportions added will affect the quantities of the other constituents of the batch to be added.

It is important to ensure that precautions are taken to avoid fire when handling the material which contains cured or uncured binder. If this material is stored in bulk form in a silo it could begin to smoulder if the grinding or melting process had raised the temperature of individual particles to a high temperature. If long term storage is contemplated, it is preferable to ignite the scrap fibre to convert the non-mineral matter to carbon.

If the scrap binder contains such a quantity of binder that the additions of e.g. sodium nitrate to maintain oxidising conditions would render uneconomic the recovery of the scrap then the excess of the carbon in the binder can be burnt off prior to storage.

In the preferred form of our process, scrap material of the following characteristics, cured "Tel" wool of filament diameters between 12 and 5 microns with bonding agent, is shredded and milled so that a batch material is produced having a bulk density of 70 lbs/cu.ft and 90% is passed by a 200 mesh screen. The glass being melted has a composition the same as the scrap, and this means that virtually a direct replacement can be made by incorporating 10% of the waste material in each batch charge fed to the tank. The molten glass is fed to a spinner and the filaments formed by attentuation of the streams of glass collected to form an insulation mat.

The presence of the organic material in the binder also enables one to eliminate a batch ingredient, namely the carbon source e.g. anthracite used to provide a reducing material in the batch.

A further system we used to process the scrap material is illustrated in the accompanying schematic drawing.

Referring to the drawing, scrap fibre 2 is fed into the top of a knife mill in which the scrap fibre is cut down into particles which are sufficiently small to pass through a screen 6. The graded particles are then passed out from the knife mill 4 by way of a surge hopper 8 to a roll crusher 10.

The roll crusher 10 breaks down the particles into a finely divided form which are then passed through an incinerator 12 to burn off excess binder and other non-mineral substances. The resulting product is fed from the outlet of the incinerator by way of a feed pipe 14 to a storage hopper 16 from which it can be dispensed for mixing with the batch material.

What we claim is:
1. A process for forming glass fibers comprising:
    collecting scrap glass fiber material derived from at least one glass fiberizing process, said glass fiber material containing on its surface a proportion of non-mineral, carbonaceous material;
    reducing the scrap glass fiber material to a finely divided, milled form;
    preparing a batch of glass fiber forming material by mixing between 5% and 25% by weight of said finely divided scrap with new material;
    said proportion of non-mineral, carbonaceous material on said scrap glass fiber being sufficient to provide a carbon content of 0.4% to 0.05% in said batch;
    feeding the batch so formed to a glass melting tank and converting the batch to a glass melt;
    maintaining oxidizing conditions within the glass melt during the melting operation, and
    transferring the melt to a fiberizing device and converting the melt into glass fibers by attenuating glass streams leaving the fiberizing device.
2. A process as claimed in claim 1 in which the non-mineral material is distributed substantially uniformly in the batch.
3. A process as claimed in any one of claims 1 in which the fibre is added to the tank without any treatment to the fibre other than converting it to a finely divided form.
4. A process as claimed in any one of claims 1 in which the fibre is heated before addition to the tank.
5. A process as claimed in claim 1 in which the tank operating conditions are altered by adding sodium nitrate to the batch.
6. A process as claimed in claim 4, in which the binder is cured by the heating of the fibre and the fibre is then finely divided by a milling process before being fed to the melting tank.
7. A process as claimed in claim 1 in which the binder of the scrap fibre in the batch is left uncured immediately prior to feeding the batch to the glass melt.
8. A process as claimed in claim 1 in which the finely divided fibre comprises particles having a mean particle size less than 500 microns.
9. A process as claimed in claim 8 in which the finely divided fibre comprises particles has a mean particle size less than 60 microns.
10. A process as claimed in claim 4 in which substantially all the non-mineral matter is converted to carbon prior to feeding to the melting tank.

* * * * *